(12) United States Patent
Maria

(10) Patent No.: US 11,582,265 B2
(45) Date of Patent: *Feb. 14, 2023

(54) VIDEO STREAMING ORCHESTRATOR

(71) Applicant: AT&T Mobility II LLC, Atlanta, GA (US)

(72) Inventor: Arturo Maria, Bellevue, WA (US)

(73) Assignee: AT&T MOBILITY II LLC, Atlanta, GA (US)

( * ) Notice: Subject to any disclaimer, the term of this patent is extended or adjusted under 35 U.S.C. 154(b) by 56 days.

This patent is subject to a terminal disclaimer.

(21) Appl. No.: 17/161,790

(22) Filed: Jan. 29, 2021

(65) Prior Publication Data

US 2021/0152611 A1    May 20, 2021

Related U.S. Application Data

(63) Continuation of application No. 16/426,991, filed on May 30, 2019, now Pat. No. 10,979,463.

(51) Int. Cl.
| | |
|---|---|
| *H04L 65/1023* | (2022.01) |
| *H04L 65/80* | (2022.01) |
| *H04L 65/65* | (2022.01) |
| *H04L 65/70* | (2022.01) |
| *H04L 65/75* | (2022.01) |
| *H04L 29/06* | (2006.01) |

(52) U.S. Cl.
CPC .......... *H04L 65/103* (2013.01); *H04L 65/65* (2022.05); *H04L 65/70* (2022.05); *H04L 65/75* (2022.05); *H04L 65/80* (2013.01)

(58) Field of Classification Search
None
See application file for complete search history.

(56) References Cited

U.S. PATENT DOCUMENTS

| | | | |
|---|---|---|---|
| 9,277,381 B2* | 3/2016 | Hicks, III | H04W 4/90 |
| 10,250,498 B1* | 4/2019 | Bales | H04L 45/64 |
| 2013/0182134 A1* | 7/2013 | Grundmann | H04N 5/23264 |
| | | | 348/208.6 |
| 2015/0003323 A1* | 1/2015 | Ma | H04W 40/12 |
| | | | 370/328 |
| 2016/0301579 A1* | 10/2016 | Djukic | H04L 41/40 |
| 2017/0093721 A1* | 3/2017 | Kano | H04L 47/122 |
| 2017/0142206 A1* | 5/2017 | Kodaypak | H04W 40/248 |
| 2018/0109590 A1* | 4/2018 | Rao | H04L 67/289 |
| 2018/0123943 A1* | 5/2018 | Lee | H04L 45/22 |
| 2019/0028329 A1* | 1/2019 | Kanakarajan | H04L 47/12 |
| 2019/0098067 A1* | 3/2019 | Sandoval | H02J 13/00024 |
| 2019/0356559 A1* | 11/2019 | Kern | H04L 41/042 |
| 2019/0372939 A1* | 12/2019 | Kalliola | H04L 63/20 |

* cited by examiner

*Primary Examiner* — Eunsook Choi
(74) *Attorney, Agent, or Firm* — Guntin & Gust, PLC; Jay Anderson

(57) ABSTRACT

A streaming orchestrator may monitor the quality of video being delivered to a home or other building. If the streaming orchestrator determines that additional performance is needed, it may create an additional User Plane Gateway in the virtual "white box" environment residing in the customer premises. The streaming orchestrator may instruct gNodeBs to continue to route traffic back to the central core functions or to route traffic to local user plane gateways which transmit video streams to the Internet via localized high-speed connections.

20 Claims, 11 Drawing Sheets

VIDEO STREAMING ORCHESTRATOR

CROSS REFERENCE TO RELATED APPLICATIONS

This application is a continuation of, and claims priority to, U.S. patent application Ser. No. 16/426,991, filed May 30, 2019, entitled "Video Streaming Orchestrator," the entire contents of which are hereby incorporated herein by reference.

BACKGROUND

Network functions virtualization (NFV) refers to the replacement of network functions on dedicated appliances—such as routers, load balancers, and firewalls—with virtualized instances running as software on commercial off-the-shelf (COTS) hardware (e.g., "white boxes"). NFV's purpose is to transform the way networks are built and services are delivered. With NFV, any enterprise can simplify a wide array of network functions, as well as maximize efficiencies and introduce new revenue-generating services faster and easier than ever before. In 5G, NFV will enable a virtual network architecture aspect that allows multiple virtual networks to be created atop a shared physical infrastructure. Virtual networks can then be customized to meet the needs of applications, services, devices, customers, or operators.

SUMMARY

As disclosed, a white box (WB) may host a streaming orchestrator (SO). A SO may monitor the quality of video being delivered to a home or other building. If an SO determines that additional performance is needed, the SO may provide instructions to create an additional User Plane Gateway in the virtual "white box" environment residing in the customer premises. The SO may instruct service provider base stations (e.g., gNBs) to continue to route traffic back to the central core functions or to route traffic to local user plane gateways (e.g., WBs) which transmit video streams to the Internet via localized high-speed connections.

In an example, an apparatus may include a processor and a memory coupled with the processor that effectuates operations. The operations may include detecting data traffic of a communication session for a mobile device, wherein the data traffic comprises video that traverses a first communication path; based on detecting the data traffic, determining, based on information associated with the data traffic, that a threshold level has been reached; based on reaching the threshold level, creating a virtual network function on a white box device; and responsive to creating the virtual network function, providing instructions to route the data traffic through a second communication path instead of the first communication path, wherein the second communication path comprises the newly created virtual network function.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

Reference will now be made to the accompanying drawings, which are not necessarily drawn to scale.

DETAILED DESCRIPTION

The video streaming customer experience in the 5G environment may be significantly enhanced by the speed of the new Radio Access Network (NR) and virtualization of the 5G core. White boxes (WBs) may be used for virtual environment user plane core functions (e.g., 5G user plane core functions) and house a video streaming orchestrator (SO) element as disclosed herein. The SO may monitor the quality of video streams delivered to a device associated with a building (e.g., home or business) or an individual user of a mobile device and determine whether to use a different (e.g., additional) virtual gateway or another network element that is traditionally in the core. If there is a determination that a different virtual gateway (e.g., User plane-Serving gateway (USGW) or User plane-Packet Data Network Gateway (UPGW)) or another core network element should be used, then SO may provide instructions to create or use a different virtual gateway.

Figure 1:
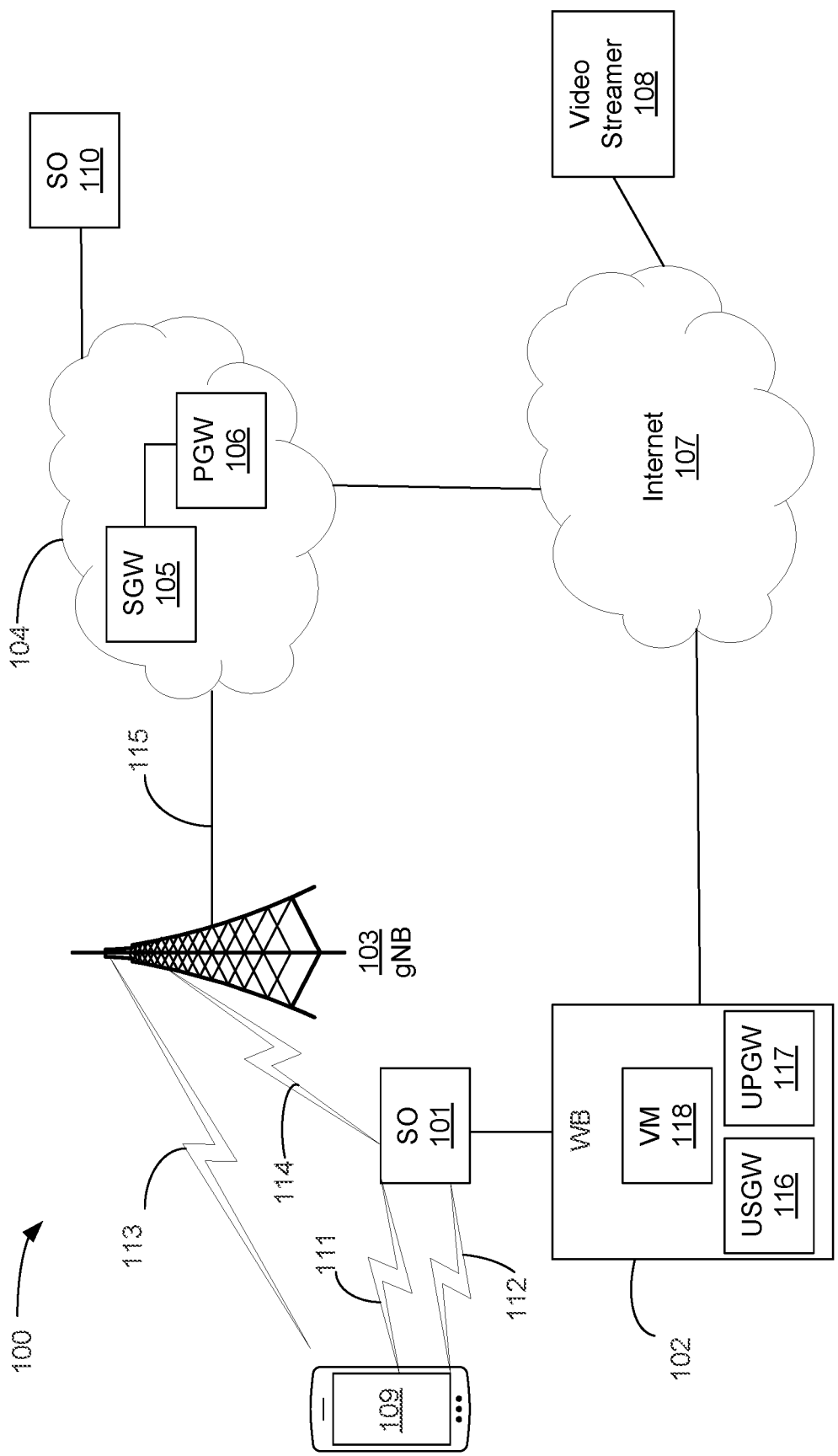
FIG. 1 illustrates a first scenario for a video streaming orchestrator.

With reference to FIG. 1, for example, additional virtual gateways may reside at edge datacenters or on the user premises. The implementation of WB 102 on the customer premises may host the additional virtual machines 118, additional virtual gateways (e.g., User plane-SGW 116 or User plane-PGW 117), or SO 101. SO 101 may instruct gNB 103 to continue to route traffic back to functions of core 104 or to route traffic to local user plane gateways (e.g., WB 102) which may transmit video streams to Internet 107 via localized high speed fiber connections.

With continued reference to FIG. 1, system 100 may include network elements, such as mobile device 109, SO 101, WB 102, gNB 103, S-GW 105, PGW 106, SO 110, or video streamer 108. Mobile device 109 may be a mobile phone, laptop, or other computing device. WB 102 may include USGW 116 or UPGW 117. The network elements may be communicatively connected via Internet 107, core 104, network link 111-network link 114, or the like. Network link 113 may be a wireless link between gNB 103 to mobile device 109. Network link 114 may be a wireless link between gNB 103 to SO 101. Network link 111 and network link 112 may be wireless links between SO 101 and mobile device 109. Network link 111, network link 113, and network link 114 may be NR (e.g., 5G) wireless links, while network 112 may be a local area network wired link or wireless link (e.g., Wi-Fi or Bluetooth). Network link 115 may be a backhaul link to core 104.

Figure 2:
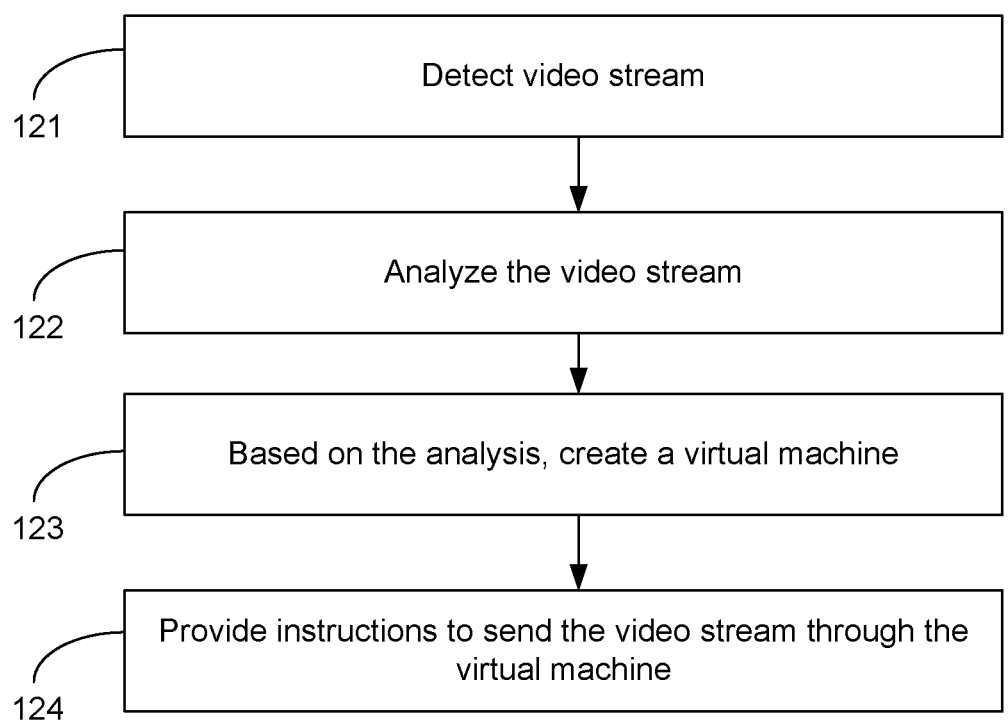
FIG. 2 illustrates an exemplary method for a video streaming orchestrator system.

FIG. 2 illustrates an exemplary method for a video streaming orchestrator system. At step 121, a streaming video associated with a communication session between two devices may be detected. The video stream may be detected by SO 101. SO 101 may receive an indication of the video stream from mobile device 109, video streamer 108, or some other network element. At step 122, SO 101 may analyze the video stream of step 121 or an associated communication path that is traveled by the video stream. The analysis may be responsive to the video stream detection. Factors associated with the video stream that may be analyzed may include network performance, type of data traffic (e.g., audio format or video coding format or codec), security level of traffic, quality service level of traffic (e.g., a predetermined priority for traffic), or the like. Network performance factors may include detected errors (e.g., link layer errors or transmission control protocol (TCP) retransmissions), congestion along a network link (e.g., network link 115) or communication path, or latency associated with streaming video, among other things. Examples of video coding formats include MPEG-2 Part 2, MPEG-4 Part 2, H.264 (MPEG-4 Part 10), HEVC, Theora, RealVideo RV40, VP9, or AV1. Examples of audio coding formats include MP3, AAC, Vorbis, FLAC, or Opus.

At step 123, based on the analysis of step 122, a virtual network function (or virtual machine) may be created. The virtual network function may be created on WB 102 and the virtual network function may include core network elements, such as a user plane service gateway, user plane packet gateway, or evolved packet core (EPC) or non-EPC elements. At step 124, the streaming video (also referred to as video stream herein) may be sent along the path through the virtual network function created in step 123. This may be triggered because of the type of data (e.g., a certain type of encryption is needed), to reduce latency, or other factors based on the information obtained by SO 101 or SO 110.

Figure 3:
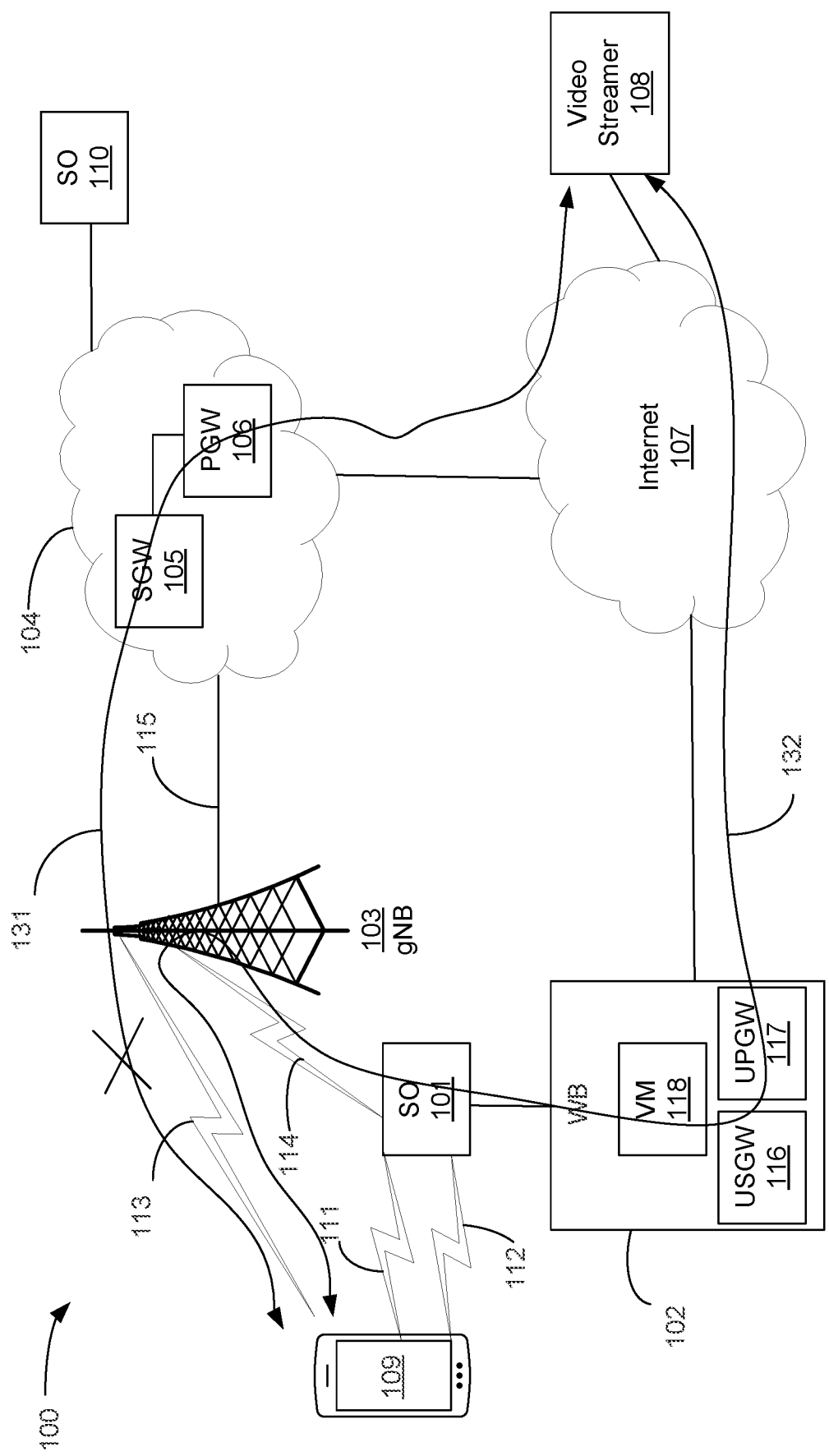
FIG. 3 illustrates a first scenario for a video streaming orchestrator.
Figure 6:
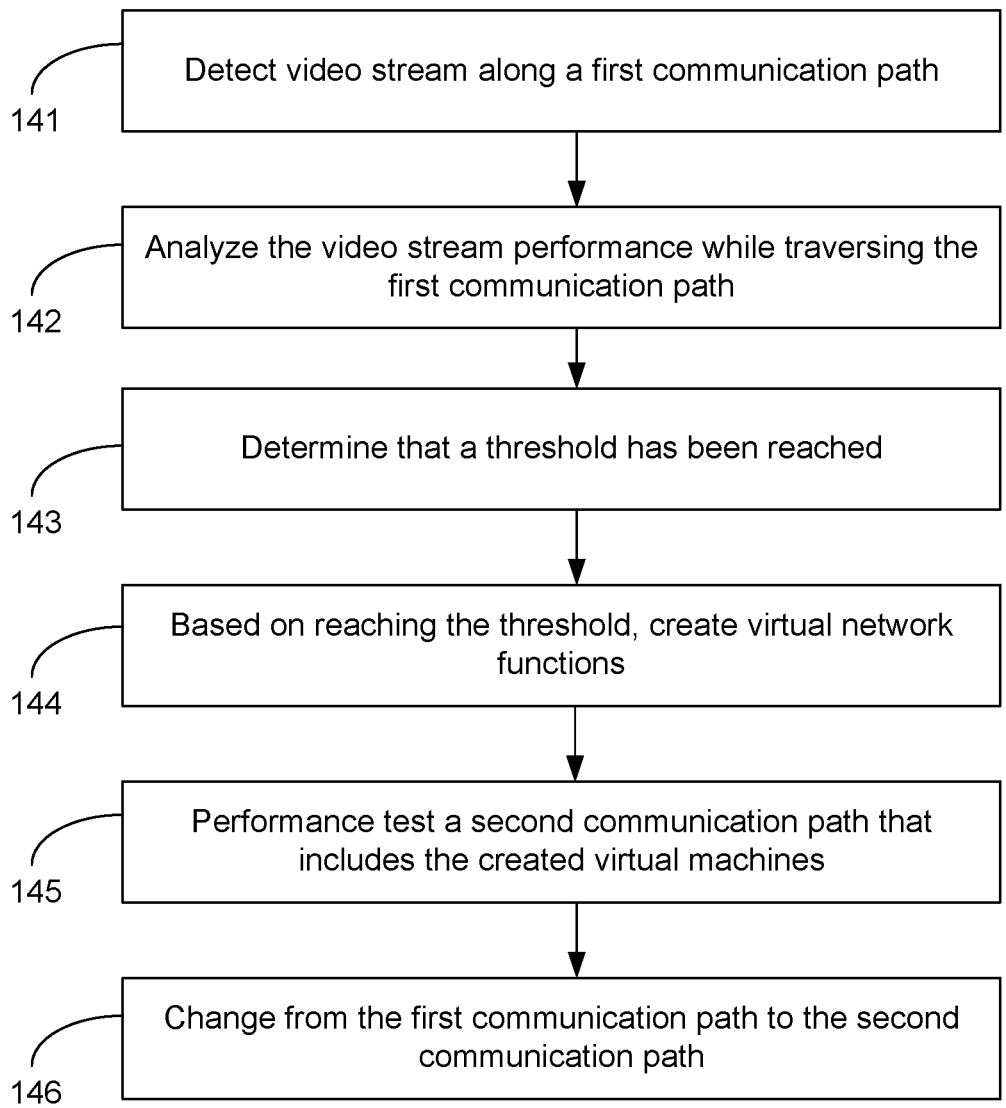
FIG. 6 illustrates an exemplary method for a video streaming orchestrator system.

FIG. 3 illustrates a first scenario for a video streaming orchestrator. Video streamer 108 may communicate along a primary communication path 131 which travels through core 104 (with SGW 105 and PGW 106), gNB 103, network link 115, and network link 113 to mobile device 109. With reference to FIG. 3 and FIG. 6 which includes a corresponding method, at step 141, the video stream along communication path 131 may be detected by SO 110. At step 142, SO 110 may analyze the performance of communication path 131. For example, SO 110 may receive information for each link or device along communication path 131 that each packet of the video stream traverses. For example, information may include input bytes, output bytes, input packets, output packets, input errors, input drops, input framing errors, output errors, output drops, usual traffic load on affected link, types of traffic on affected link (e.g., defined QoS, video, voice, TCP, UDP, source address, etc.), or routing information, among other things. In addition, information may include TCP related errors such as retransmissions, connection reset, frame out of sequence, missing data, or the like. It is contemplated that SO 110 may analyze the performance of communication path 131 per streaming service. For example, there may be a streaming service 1 for gaming and streaming service 2 for movies. The performance of each streaming service for video streams along a path may be independently evaluated. It is further contemplated that a video stream may have packets that travel multiple paths, and each path may be analyzed based on using techniques such as median or mean performance across the multiple paths.

At step 143, based on the analysis of the information of step 142 (or step 122), a threshold may be reached (e.g., threshold errors or latency for link 115) that may trigger steps for changing the communication path.

With continued reference to FIG. 3 and FIG. 2, at step 144, based on reaching a threshold, SO 110 may communicate with WB 102 to create virtual machines or virtual network functions USGW and UPGW, which may have similar properties as SGW 105 and PGW 106 in core 104. In addition, VM 118 may be created in order to test the performance of some or all of communication path 132. It is contemplated that VM 118 may be created on WB 102, SO 101, mobile device 109, or some other equipment on or near the customer premise. At step 145, performance testing of communication path 132 may occur. Performance testing may include streaming a test video with similar characteristics as the video streaming over communication path 131. SO 110 or SO 101 may determine whether the performance of communication path 132 is within an acceptable threshold (e.g., based on path information similar to step 142 or step 122).

At step 146, based on the performance of communication path 132 being within an acceptable threshold, SO 110 may provide instructions to mobile device 109, gNB 103, SO 101, video streamer 108, WB 102, or other network elements in order to change to communication path 132 from communication path 131 for video streaming. As shown in FIG. 3, gNB 103 may remain included in a communication path for video streaming. It is contemplated that a first streaming service may change to communication path 132 and a second streaming service may remain on communication path 131.

Figure 4:
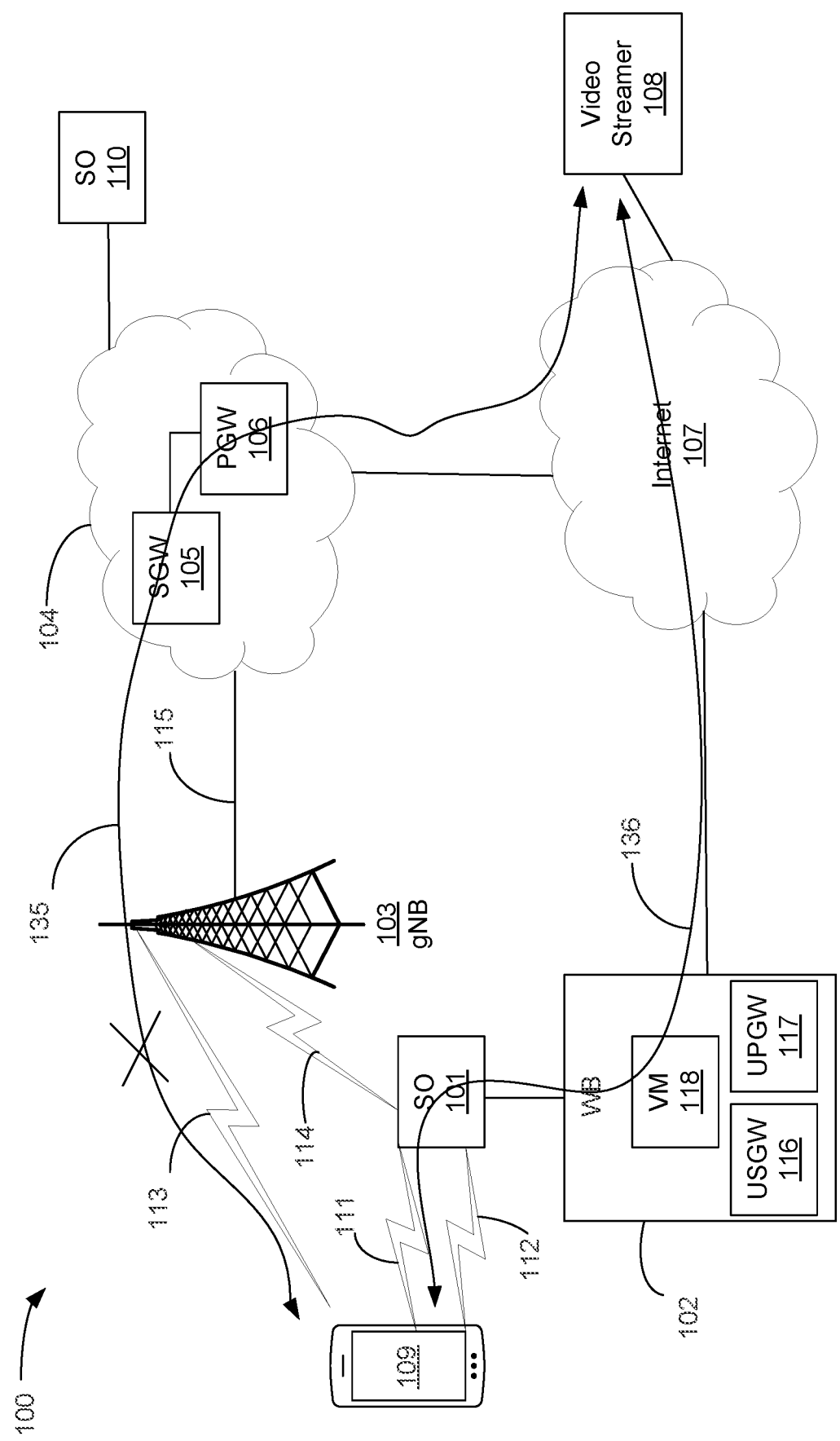
FIG. 4 illustrates a first scenario for a video streaming orchestrator.

FIG. 4 illustrates a second scenario for a video streaming orchestrator. Video streamer 108 may communicate along a primary communication path 135 which travels through core 104 (with SGW 105 and PGW 106), gNB 103, network link 115, and network link 113 to mobile device 109. With reference to FIG. 4 and associated method steps in FIG. 7, at step 151, the video stream along communication path 135 may be detected by SO 110. At step 152, SO 110 may analyze the performance of communication path 135 (similar to step 142). The performance of each streaming service for video streams along a path may be independently evaluated.

At step 153, based on the analysis of the information of step 152 (or step 122 or step 142), a threshold may be reached (e.g., threshold errors or latency for link 115) that may trigger steps for changing the communication path.

Figure 7:
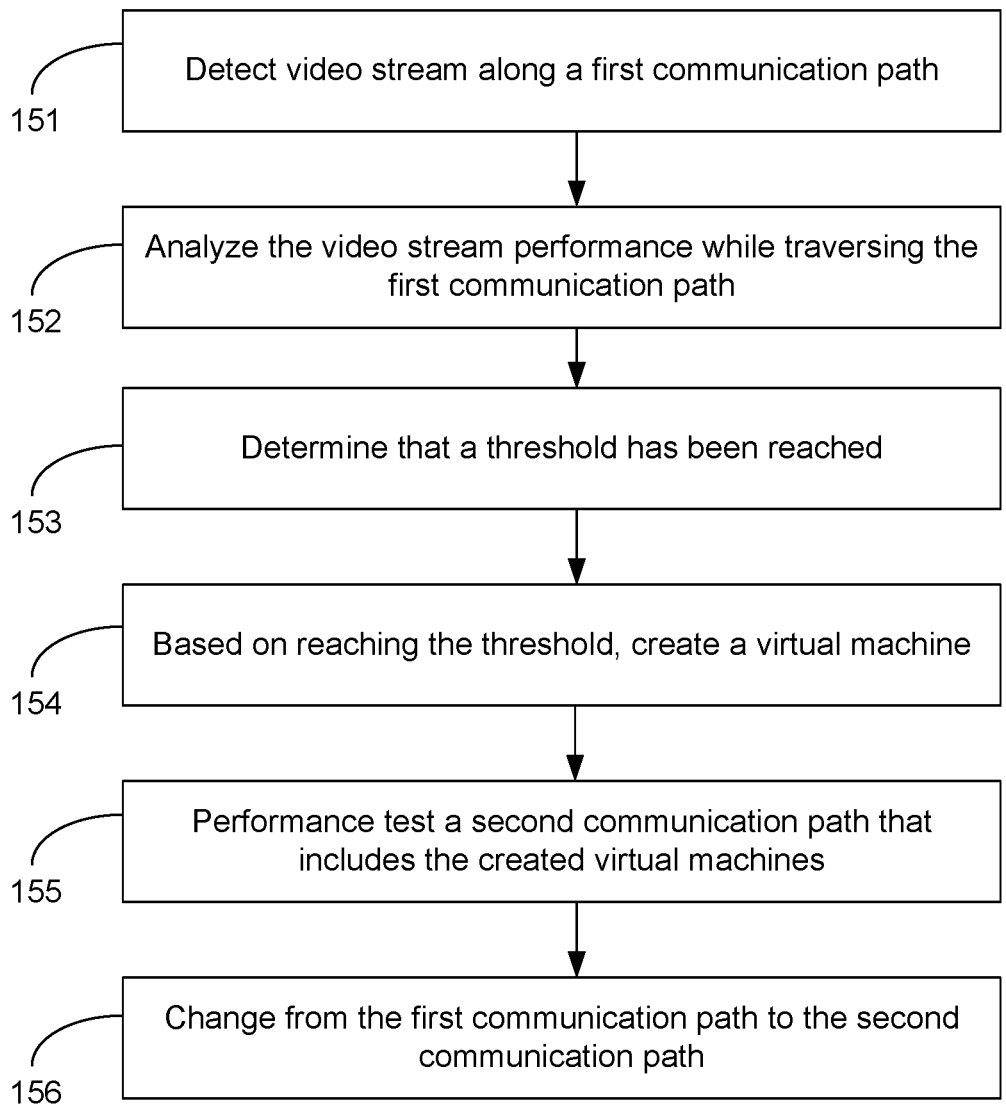
FIG. 7 illustrates an exemplary method for a video streaming orchestrator system.

With continued reference to FIG. 4 and FIG. 7, at step 154, based on reaching a threshold, SO 110 may communicate with WB 102 to create virtual machines. VM 118 may be created in order to test the performance of some or all of communication path 136. VM 118 may route and record the activity of a particular video streaming service (e.g., sports streaming service) on communication path 136. The recorded activity information may assist with advertising to mobile device 109 (or similarly situated users individually or as a group), determining what type of video format (or other information) provides the best video streaming performance, preexecutes streaming video, planning for network upgrades, or other network changes. It is contemplated that USGW and UPGW may not be used in this scenario. At step 155, performance testing of communication path 136 occurs. SO 110 or SO 101 may determine whether the performance of communication path 136 is within an acceptable threshold (e.g., based on path information similar to step 142 or step 122).

At step 156, based on the performance of communication path 136 being within an acceptable threshold, SO 110 may provide instructions to mobile device 109, gNB 103, SO 101, video streamer 108, WB 102, or other network elements in order to change to communication path 136 from communication path 135 for video streaming of one or more services. The instructions to change communication paths may be in the form of a routing table, switching table (e.g., MAC addresses), or the like update. As shown in FIG. 4, network link 111 or network link 112 may be included in communication path 136 and USGW 116 and UPGW 117 may be excluded. included in a communication path for video streaming. It is contemplated that network link 113 or network link 111 may operate at the same time with different video streaming services.

Figure 5:
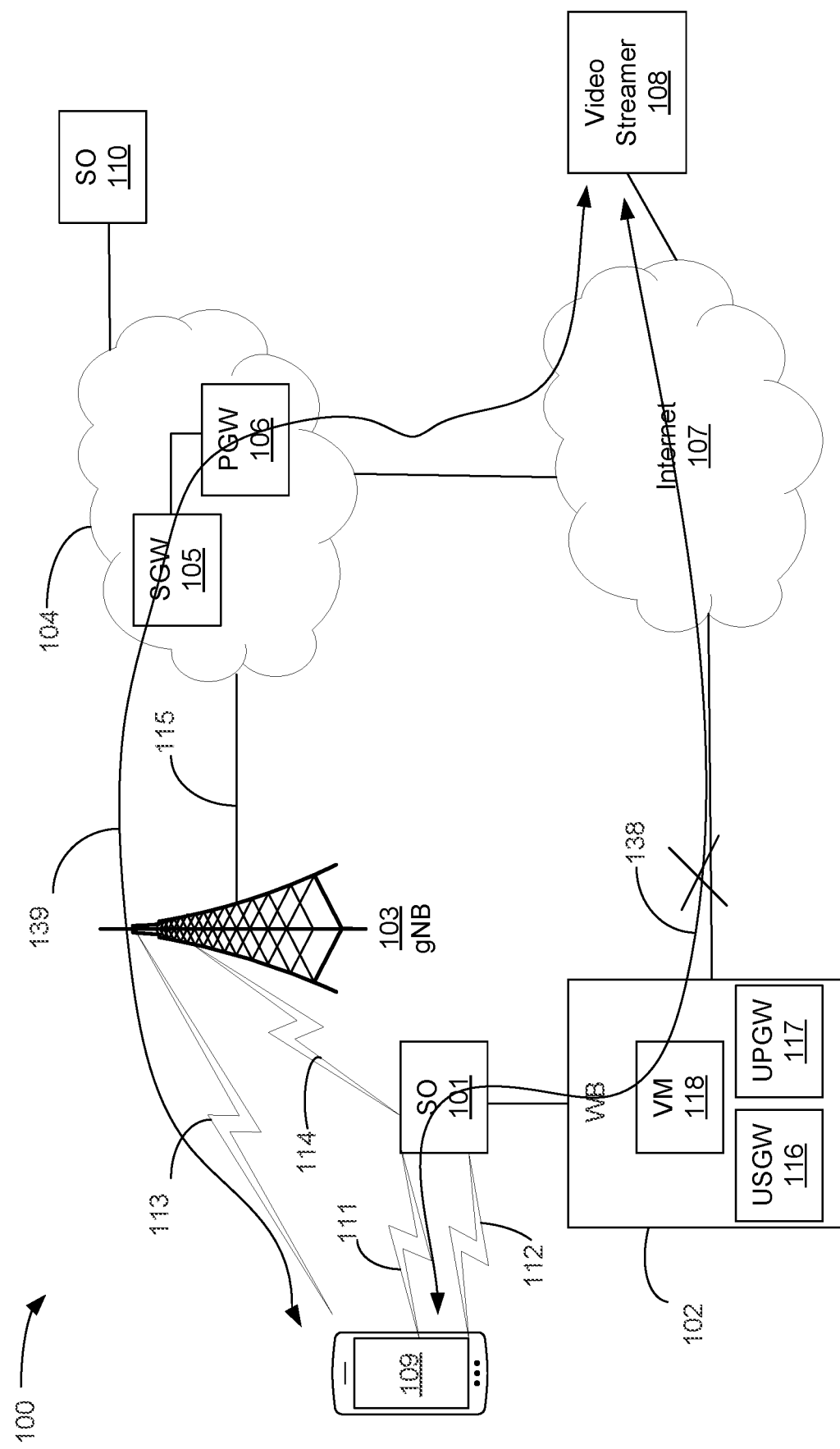
FIG. 5 illustrates a first scenario for a video streaming orchestrator.

FIG. 5 illustrates a third scenario for a video streaming orchestrator. Video streamer 108 may communicate along a primary communication path 138 which travels through WB 102, SO 101, and network link 111 to mobile device 109. Similar analysis is done as provided in FIG. 3 or FIG. 4 and associated method steps. Here, SO 101 may monitor the performance of the video streams. It is contemplated that SO 101 or SO 110 may monitor the performance and provide instructions to change video streams. SO 101 and SO 110 may exchange information and coordinate changes to maximize efficiencies. For example, SO 101 may communicate with SO 110 to determine whether similar video streams (e.g., similar compression or encryption characteristics) are traveling along a desired path. SO 110 may send SO 101 information about similar streams along communication path 139 to determine whether there is likely better performance by switching from communication path 138 to communication path 139. The exchange of information may help predict (e.g., determine a likelihood) that a first communication path may perform better (e.g., within appropriate latency, error, or other factors) than a second communication path for similar video streams.

Additional perspective is provided below. Implementing an on-premise virtual environment which hosts user plane gateways may significantly optimize and provide capabilities for video streaming traffic as well as other data traffic (e.g., M2M data traffic, gaming data traffic, interactive video, or the like). The disclosed subject matter provides options to network operators which may address latency or other performance issues of a network. In an example, implementing the disclosed subject matter may allow networks to direct traffic from a gNB to core datacenters or to a local customer premise WB virtual environment. This directing of traffic may improve performance because the gNB is communicating with a localized gateway running virtual network functions instead of going back to a core network data center, as provided in FIG. 3. The SO may be a local or core network resource that determines how to influence performance of the network. There are many factors (e.g., information of step 142 or step 122) that may affect performance. Localizing control of gateways is one example of how performance of video streaming may be improved.

The functions of SO 101 may be in a separate device or within one or more other network elements (e.g., mobile device 109 with SO virtual network function or WB 102 with SO virtual network function). WB 102 may create virtual machines or virtual network functions that include network elements, such as USGW 116, UPGW 117, gNB 103, an eNB, an MME, or the like. WB 102, which may reside on the customer premises, may become the core data center or edge datacenter for user functions for that customer premise. It is contemplated that methods and systems used herein may be applied to data traffic other than video streaming data traffic.

The WB may host a Streaming Orchestrator which may be a virtual network function. The SO, USGW, UPGW, VM, or the like may be implemented as a virtual machine, virtual network function, or a Container (e.g., Docker Container and Kubernetes orchestrators).

Figure 8:
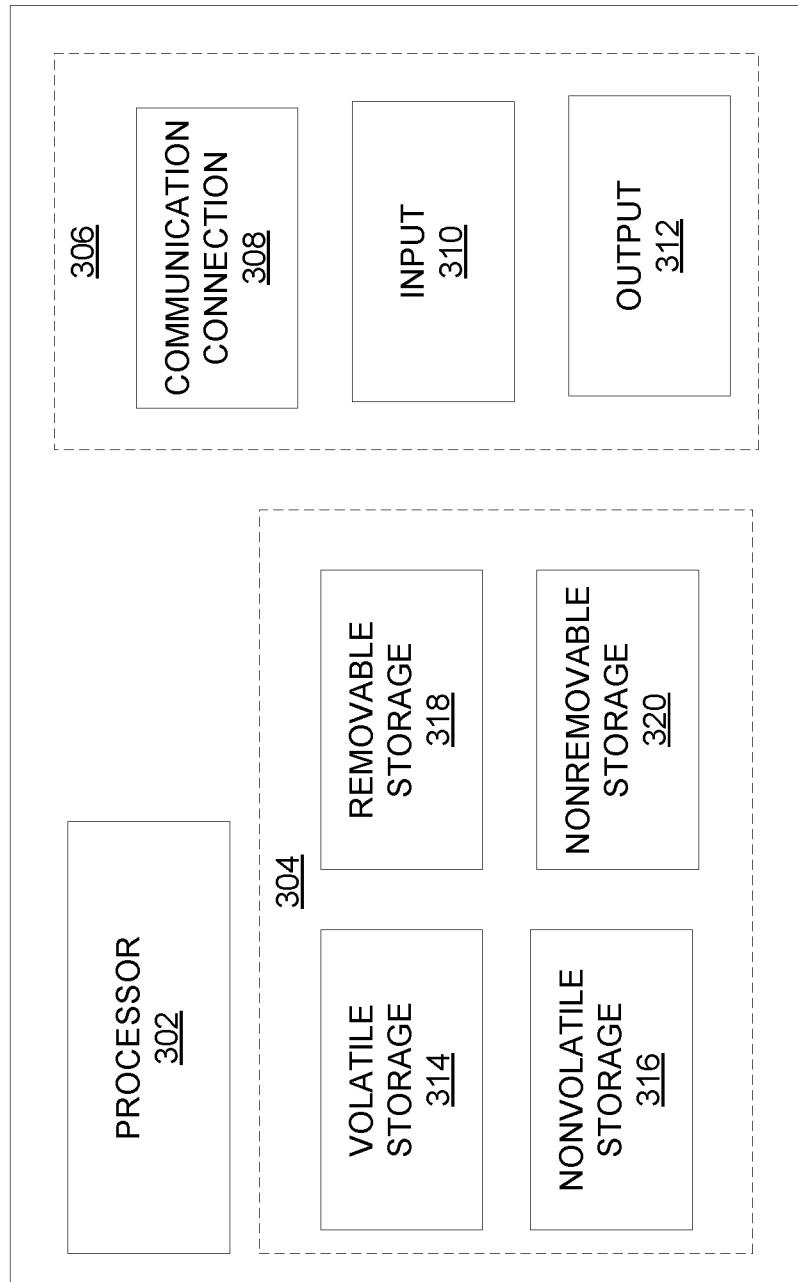
FIG. 8 illustrates a schematic of an exemplary network device.

FIG. 8 is a block diagram of network device 300 that may be connected to or comprise a component system 100. Network device 300 may comprise hardware or a combination of hardware and software. The functionality to facilitate telecommunications via a telecommunications network may reside in one or combination of network devices 300. Network device 300 depicted in FIG. 8 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an automatic location function server (ALFS), a gateway mobile location center (GMLC), a radio access network (RAN), a serving mobile location center (SMLC), or the like, or any appropriate combination thereof. It is emphasized that the block diagram depicted in FIG. 8 is exemplary and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength. As evident from the description herein, network device 300 is not to be construed as software per se.

In addition to processor 302 and memory 304, network device 300 may include an input/output system 306. Processor 302, memory 304, and input/output system 306 may be coupled together (coupling not shown in FIG. 8) to allow communications between them. Each portion of network device 300 may comprise circuitry for performing functions associated with each respective portion. Thus, each portion may comprise hardware, or a combination of hardware and software. Accordingly, each portion of network device 300 is not to be construed as software per se. Input/output system 306 may be capable of receiving or providing information from or to a communications device or other network entities configured for telecommunications. For example, input/output system 306 may include a wireless communications (e.g., 3G/4G/5G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, Zig- Bee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a non-removable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

Figure 9:
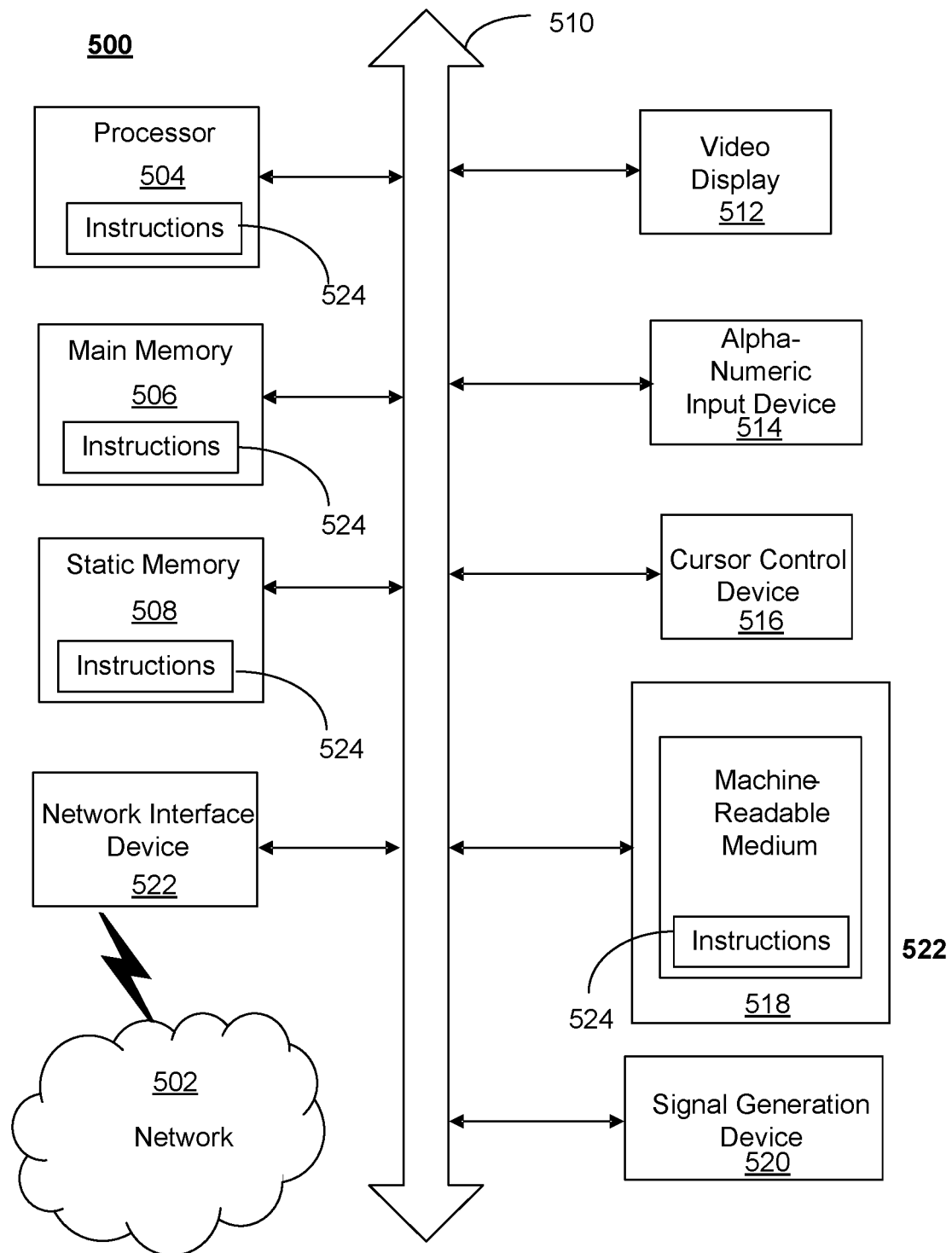
FIG. 9 illustrates an exemplary communication system that provides wireless telecommunication services over wireless communication networks.

FIG. 9 depicts an exemplary diagrammatic representation of a machine in the form of a computer system 500 within which a set of instructions, when executed, may cause the machine to perform any one or more of the methods described herein (e.g., FIG. 2, FIG. 6, or FIG. 7). One or more instances of the machine can operate, for example, as processor 302, mobile device 109, gNB 103, video streamer 108, SGW 105, WB 102 and other devices of system 100 and other figures. In some embodiments, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the embodiments described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium 524 on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

Communication networks may be migrated from using specialized networking equipment executing on dedicated hardware, like routers, firewalls, and gateways, to networks executing as virtualized network functions (VNF) in a cloud infrastructure. To provide a service, a set of VNFs may be instantiated on the general purpose hardware. Each VNF may require one or more virtual machines (VMs) to be instantiated. In turn, VMs may require various resources, such as memory, virtual central processing units (vCPUs), and network interfaces or network interface cards (NICs).

Figure 10A:
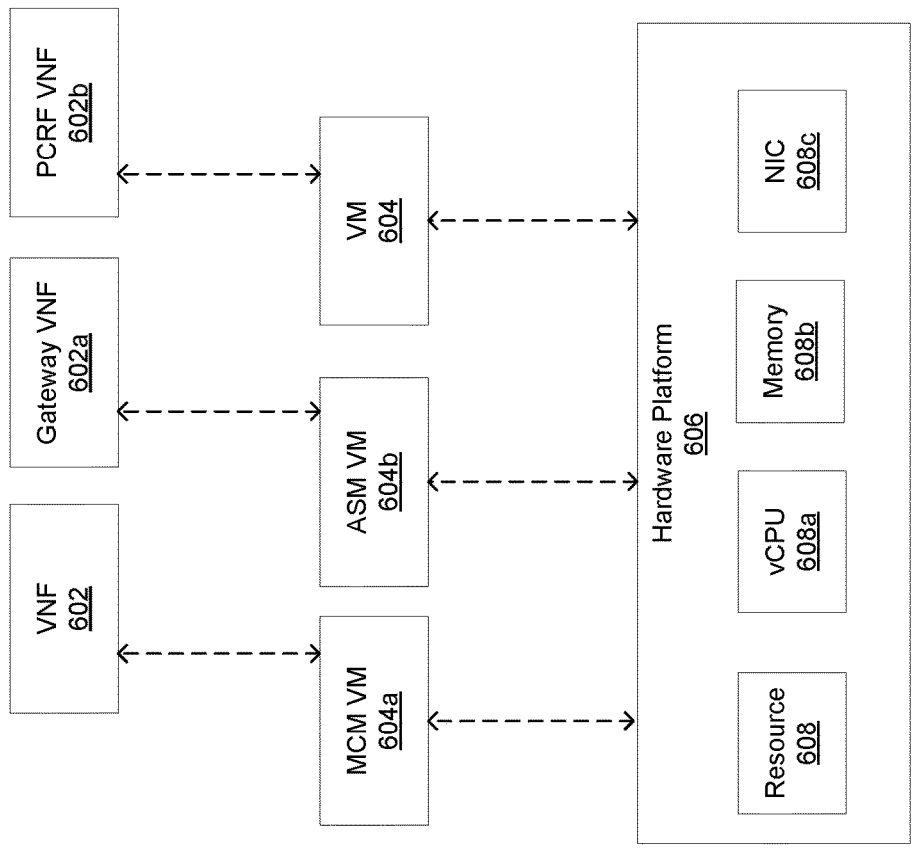
FIG. 10A is a representation of an exemplary network.

FIG. 10A is a representation of an exemplary network 600. Network 600 (e.g., system 100) may comprise an SDN—that is, network 600 may include one or more virtualized functions implemented on general purpose hardware, such as in lieu of having dedicated hardware for every network function. That is, general purpose hardware of network 600 may be configured to run virtual network elements to support communication services, such as mobility services, including consumer services and enterprise services. These services may be provided or measured in sessions.

A virtual network functions (VNFs) 602 may be able to support a limited number of sessions. Each VNF 602 may have a VNF type that indicates its functionality or role. For example, FIG. 10A illustrates a gateway VNF 602a and a policy and charging rules function (PCRF) VNF 602b. Additionally or alternatively, VNFs 602 may include other types of VNFs. Each VNF 602 may use one or more virtual machines (VMs) 604 to operate. Each VM 604 may have a VM type that indicates its functionality or role. For example, FIG. 10A illustrates a management control module (MCM) VM 604a and an advanced services module (ASM) VM 604b. Additionally or alternatively, VMs 604 may include other types of VMs, such as a DEP VM. Each VM 604 may consume various network resources from a hardware platform 606, such as a resource 608, a virtual central processing unit (vCPU) 608a, memory 608b, or a network interface card (NIC) 608c. Additionally or alternatively, hardware platform 606 may include other types of resources 608.

Figure 10B:
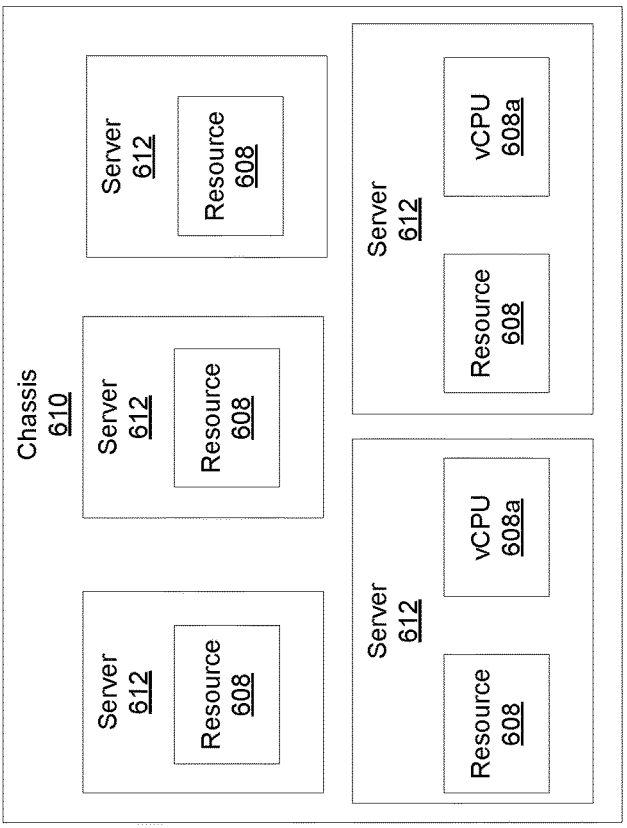
FIG. 10B is a representation of an exemplary hardware platform for a network.
Figure 10B:
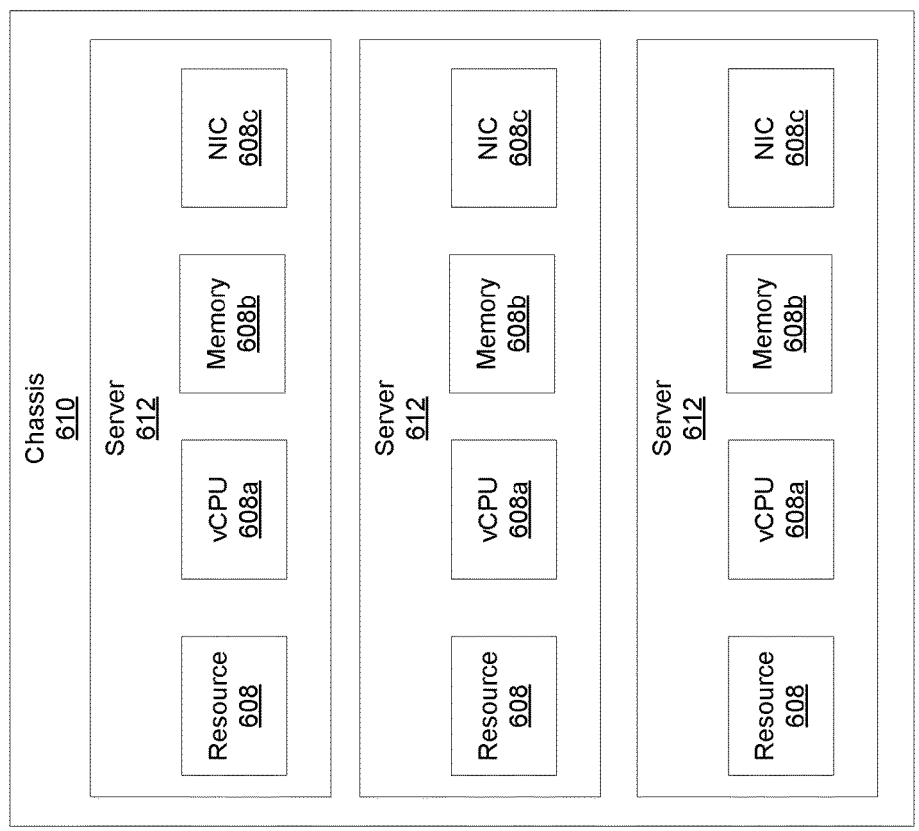

While FIG. 10A illustrates resources 608 as collectively contained in hardware platform 606, the configuration of hardware platform 606 may isolate, for example, certain memory 608c from other memory 608c. FIG. 10B provides an exemplary implementation of hardware platform 606.

Hardware platform 606 may comprise one or more chassis 610. Chassis 610 may refer to the physical housing or platform for multiple servers or other network equipment. In an aspect, chassis 610 may also refer to the underlying network equipment. Chassis 610 may include one or more servers 612. Server 612 may comprise general purpose computer hardware or a computer. In an aspect, chassis 610 may comprise a metal rack, and servers 612 of chassis 610 may comprise blade servers that are physically mounted in or on chassis 610.

Each server 612 may include one or more network resources 608, as illustrated. Servers 612 may be communicatively coupled together (not shown) in any combination or arrangement. For example, all servers 612 within a given chassis 610 may be communicatively coupled. As another example, servers 612 in different chasses 610 may be communicatively coupled. Additionally or alternatively, chasses 610 may be communicatively coupled together (not shown) in any combination or arrangement.

The characteristics of each chassis 610 and each server 612 may differ. For example, FIG. 10B illustrates that the number of servers 612 within two chasses 610 may vary. Additionally or alternatively, the type or number of resources 610 within each server 612 may vary. In an aspect, chassis 610 may be used to group servers 612 with the same resource characteristics. In another aspect, servers 612 within the same chassis 610 may have different resource characteristics.

Given hardware platform 606, the number of sessions that may be instantiated may vary depending upon how efficiently resources 608 are assigned to different VMs 604. For example, assignment of VMs 604 to particular resources 608 may be constrained by one or more rules. For example, a first rule may require that resources 608 assigned to a particular VM 604 be on the same server 612 or set of servers 612. For example, if VM 604 uses eight vCPUs 608a, 1 GB of memory 608b, and 2 NICs 608c, the rules may require that all of these resources 608 be sourced from the same server 612. Additionally or alternatively, VM 604 may require splitting resources 608 among multiple servers 612, but such splitting may need to conform with certain restrictions. For example, resources 608 for VM 604 may be able to be split between two servers 612. Default rules may apply. For example, a default rule may require that all resources 608 for a given VM 604 must come from the same server 612.

An affinity rule may restrict assignment of resources 608 for a particular VM 604 (or a particular type of VM 604). For example, an affinity rule may require that certain VMs 604 be instantiated on (that is, consume resources from) the same server 612 or chassis 610. For example, if VNF 602 uses six MCM VMs 604a, an affinity rule may dictate that those six MCM VMs 604a be instantiated on the same server 612 (or chassis 610). As another example, if VNF 602 uses MCM VMs 604a, ASM VMs 604b, and a third type of VMs 604, an affinity rule may dictate that at least the MCM VMs 604a and the ASM VMs 604b be instantiated on the same server 612 (or chassis 610). Affinity rules may restrict assignment of resources 608 based on the identity or type of resource 608, VNF 602, VM 604, chassis 610, server 612, or any combination thereof.

An anti-affinity rule may restrict assignment of resources 608 for a particular VM 604 (or a particular type of VM 604). In contrast to an affinity rule—which may require that certain VMs 604 be instantiated on the same server 612 or chassis 610—an anti-affinity rule requires that certain VMs 604 be instantiated on different servers 612 (or different chasses 610). For example, an anti-affinity rule may require that MCM VM 604a be instantiated on a particular server 612 that does not contain any ASM VMs 604b. As another example, an anti-affinity rule may require that MCM VMs 604a for a first VNF 602 be instantiated on a different server 612 (or chassis 610) than MCM VMs 604a for a second VNF 602. Anti-affinity rules may restrict assignment of resources 608 based on the identity or type of resource 608, VNF 602, VM 604, chassis 610, server 612, or any combination thereof.

Within these constraints, resources 608 of hardware platform 606 may be assigned to be used to instantiate VMs 604, which in turn may be used to instantiate VNFs 602, which in turn may be used to establish sessions. The different combinations for how such resources 608 may be assigned may vary in complexity and efficiency. For example, different assignments may have different limits of the number of sessions that can be established given a particular hardware platform 606.

For example, consider a session that may require gateway VNF 602a and PCRF VNF 602b. Gateway VNF 602a may require five VMs 604 instantiated on the same server 612, and PCRF VNF 602b may require two VMs 604 instantiated on the same server 612. (Assume, for this example, that no affinity or anti-affinity rules restrict whether VMs 604 for PCRF VNF 602b may or must be instantiated on the same or different server 612 than VMs 604 for gateway VNF 602a.) In this example, each of two servers 612 may have enough resources 608 to support 10 VMs 604. To implement sessions using these two servers 612, first server 612 may be instantiated with 10 VMs 604 to support two instantiations of gateway VNF 602a, and second server 612 may be instantiated with 9 VMs: five VMs 604 to support one instantiation of gateway VNF 602a and four VMs 604 to support two instantiations of PCRF VNF 602b. This may leave the remaining resources 608 that could have supported the tenth VM 604 on second server 612 unused (and unusable for an instantiation of either a gateway VNF 602a or a PCRF VNF 602b). Alternatively, first server 612 may be instantiated with 10 VMs 604 for two instantiations of gateway VNF 602a and second server 612 may be instantiated with 10 VMs 604 for five instantiations of PCRF VNF 602b, using all available resources 608 to maximize the number of VMs 604 instantiated.

Consider, further, how many sessions each gateway VNF 602a and each PCRF VNF 602b may support. This may factor into which assignment of resources 608 is more efficient. For example, consider if each gateway VNF 602a supports two million sessions, and if each PCRF VNF 602b supports three million sessions. For the first configuration—three total gateway VNFs 602a (which satisfy the gateway requirement for six million sessions) and two total PCRF VNFs 602b (which satisfy the PCRF requirement for six million sessions)—would support a total of six million sessions. For the second configuration—two total gateway VNFs 602a (which satisfy the gateway requirement for four million sessions) and five total PCRF VNFs 602b (which satisfy the PCRF requirement for 15 million sessions)—would support a total of four million sessions. Thus, while the first configuration may seem less efficient looking only at the number of available resources 608 used (as resources 608 for the tenth possible VM 604 are unused), the second configuration is actually more efficient from the perspective of being the configuration that can support more the greater number of sessions.

To solve the problem of determining a capacity (or, number of sessions) that can be supported by a given hardware platform 605, a given requirement for VNFs 602 to support a session, a capacity for the number of sessions each VNF 602 (e.g., of a certain type) can support, a given requirement for VMs 604 for each VNF 602 (e.g., of a certain type), a give requirement for resources 608 to support each VM 604 (e.g., of a certain type), rules dictating the assignment of resources 608 to one or more VMs 604 (e.g., affinity and anti-affinity rules), the chasses 610 and servers 612 of hardware platform 606, and the individual resources 608 of each chassis 610 or server 612 (e.g., of a certain type), an integer programming problem may be formulated.

As described herein, a telecommunications system wherein management and control utilizing a software designed network (SDN) and a simple IP are based, at least in part, on user equipment, may provide a wireless management and control framework that enables common wireless management and control, such as mobility management, radio resource management, QoS, load balancing, etc., across many wireless technologies, e.g. LTE, 5G NR, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple M2M devices—through enhanced wireless management.

While examples of a telecommunications system in which alerts associated with video streaming orchestration can be processed and managed have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

While a telecommunications system has been described in connection with the various examples of the various figures, it is to be understood that other similar implementations may be used or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, a telecommunications system as described herein should not be limited to any single example, but rather should be construed in breadth and scope in accordance with the appended claims.

In describing preferred methods, systems, or apparatuses of the subject matter of the present disclosure—video streaming orchestration—as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose. In addition, the use of the word "or" is generally used inclusively unless otherwise provided herein.

This written description uses examples to enable any person skilled in the art to practice the claimed subject matter, including making and using any devices or systems and performing any incorporated methods. The patentable scope is defined by the claims, and may include other examples that occur to those skilled in the art (e.g., skipping steps, combining steps, or adding steps between exemplary methods disclosed herein). Such other examples are intended to be within the scope of the claims if they have structural elements that do not differ from the literal language of the claims, or if they include equivalent structural elements with insubstantial differences from the literal languages of the claims.

Disclosed herein are method, systems, apparatuses, and computer readable storage mediums for orchestrating the communication paths for data traffic that includes streaming video or the like. The disclosed subject matter may detect data traffic of a communication session for a mobile device, wherein the data traffic may include video that traverses a first communication path; based on detecting the data traffic that includes video, determine, based on information associated with the data traffic that may include video traversing the first communication path, that a threshold level has been reached; based on reaching the threshold level, creating a virtual network function on a white box device; and responsive to creating the virtual network function, provide instructions to route the data traffic that includes video through a second communication path instead of the first communication path, wherein the second communication path includes the virtual network function. The virtual network function may include a user plane serving gateway, a user plane packet data network gateway, or other core network (e.g., EPC), base station, or the like virtualized element. The information may include error information of a network link, latency information of the network link, type of data traffic (e.g., video format or codec), or the like along the first communication path. In addition, based on reaching the threshold level, further creating a virtual machine on the white box device, wherein the second communication path may include the virtual machine, wherein the virtual machine may be dedicated to a video stream service associated with the streaming video. All combinations in this paragraph (including the removal or addition of steps) are contemplated in a manner that is consistent with the other portions of the detailed description.

What is claimed:

1. A system comprising:
   one or more processors; and
   memory coupled with the one or more processors, the memory storing executable instructions that when executed by the one or more processors cause the one or more processors to effectuate operations comprising:
      detecting data traffic of a communication session for a mobile device, wherein the data traffic comprises video that traverses a first communication path;
      determining, based on information associated with the data traffic that comprises video traversing the first communication path, that a threshold level has been reached;
      based on reaching the threshold level, creating a virtual machine on a white box device; and
      providing instructions to route the data traffic that comprises video through a second communication path instead of the first communication path, wherein the second communication path comprises the virtual machine, wherein the virtual machine is dedicated to a video stream service associated with the video.

2. The system of claim 1, wherein the information comprises audio coding format information.

3. The system of claim 1, wherein the information comprises video coding format information.

4. The system of claim 1, wherein the information comprises error information of a network link along the first communication path.

5. The system of claim 1, wherein the information comprises latency information of a network link along the first communication path.

6. The system of claim 1, wherein the information comprises video format information associated with the video.

7. The system of claim 1, wherein the information comprises a security level of the data traffic.

8. A method comprising:
   detecting data traffic of a communication session for a mobile device, wherein the data traffic comprises video that traverses a first communication path;
   determining, based on information associated with the data traffic that comprises video traversing the first communication path, that a threshold level has been reached;
   based on reaching the threshold level, creating a virtual machine on a white box device; and
   providing instructions to route the data traffic that comprises video through a second communication path instead of the first communication path, wherein the second communication path comprises the virtual machine, wherein the virtual machine is dedicated to a video stream service associated with the video.

9. The method of claim 8, wherein the information comprises audio coding format information.

10. The method of claim 8, wherein the information comprises video coding format information.

11. The method of claim 9, wherein the information comprises error information of a network link along the first communication path.

12. The method of claim 8, wherein the information comprises latency information of a network link along the first communication path.

13. The method of claim 8, wherein the information comprises video format information associated with the video.

14. The method of claim 8, wherein the information comprises a security level of the data traffic.

15. A non-transitory machine-readable medium comprising executable instructions that, when executed by a processing system including a processor, facilitate performance of operations comprising:
   detecting data traffic of a communication session for a mobile device, wherein the data traffic comprises video that traverses a first communication path;
   determining, based on information associated with the data traffic that comprises video traversing the first communication path, that a threshold level has been reached;
   based on reaching the threshold level, creating a virtual machine on a white box device; and
   providing instructions to route the data traffic that comprises video through a second communication path instead of the first communication path, wherein the second communication path comprises the virtual machine, wherein the virtual machine is dedicated to a video stream service associated with the video.

16. The non-transitory machine-readable medium of claim 15, wherein the information comprises audio coding format information.

17. The non-transitory machine-readable medium of claim 15, wherein the information comprises video coding format information.

18. The non-transitory machine-readable medium of claim 15, wherein the information comprises error information of a network link along the first communication path.

19. The non-transitory machine-readable medium of claim 15, wherein the information comprises latency information of a network link along the first communication path.

20. The non-transitory machine-readable medium of claim 15, wherein the information comprises video format information associated with the video.

* * * * *